United States Patent
Chang et al.

(10) Patent No.: US 8,234,114 B2
(45) Date of Patent: Jul. 31, 2012

(54) SPEECH INTERACTIVE SYSTEM AND METHOD

(75) Inventors: Yao-Yuan Chang, Taipei (TW);
Sen-Chia Chang, Hsinchu (TW);
Shih-Chieh Chien, Taichung (TW);
Jia-Jang Tu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 496 days.

(21) Appl. No.: 12/541,872

(22) Filed: Aug. 14, 2009

(65) Prior Publication Data
US 2010/0223060 A1 Sep. 2, 2010

(30) Foreign Application Priority Data
Feb. 27, 2009 (TW) .............................. 98106366 A

(51) Int. Cl.
*G10L 15/04* (2006.01)

(52) U.S. Cl. ........ 704/252; 704/231; 704/235; 704/270; 704/257

(58) Field of Classification Search ............ 704/251, 704/231, 235, 270, 257
See application file for complete search history.

(56) References Cited

U.S. PATENT DOCUMENTS

| 5,281,143 A | 1/1994 | Arad et al. | |
| 5,579,436 A * | 11/1996 | Chou et al. | 704/244 |
| 5,737,489 A * | 4/1998 | Chou et al. | 704/256 |

FOREIGN PATENT DOCUMENTS

| CN | 1581130 | 2/2005 |
| CN | 101064070 | 10/2007 |
| TW | M244957 | 10/2004 |
| TW | I247249 | 10/2005 |

* cited by examiner

*Primary Examiner* — Qi Han
(74) *Attorney, Agent, or Firm* — Lin & Associates IP, Inc.

(57) ABSTRACT

The present invention relates to a speech interactive system and method. The system comprises a target information receiving module, an interactive mode setting and speech processing module, an interactive information update module, a decision module, and an output response module. It receives target information and sets corresponding target text sentence information. It also receives a user's speech signal, sets an interactive mode, decides the speech's target text sentence information, and generates an assessment for the target text sentence. Under the set interactive mode, the system updates the information in an interactive information recording table according to the assessment and a timing count. According to the interactive mode and the recorded information, an output mode for the target text sentence information is generated. According to the output mode and the recorded information, the response information is generated.

25 Claims, 13 Drawing Sheets

SPEECH INTERACTIVE SYSTEM AND METHOD

TECHNICAL FIELD

The present disclosure generally relates to a speech interactive system and method.

BACKGROUND

Many current speech interactive systems and devices are to make the machines understand the user's intention and achieve certain target, such as, using speech command to control the terminal device, or using speech processing to understand the user's intention and responding with information or action. The key point is to respond with the target information or action matching the user's intention. Another type of speech interactive systems and devices is for learning language. This application is to dialog and respond, or perform pronunciation assessment, via the speech inputted by the user to achieve the learning objective. This type of speech interactive system and device is usually implemented with the objective of responding to the user with correct information matching the user's intention.

The learning usually follows the following strategies: (1) using direct teaching to transmit information and using practice to achieve the learning objective; (2) using visual aid, questions and answer to achieve the learning objective; (3) using exploratory or discovery strategy, and using computer simulation information or virtual reality to construct knowledge; and (4) using evaluating questionnaire to examine the learning process and result to inspire the self-discipline learning. Basically, the learning is based on direct teaching or guided learning.

There are many prior arts on speech interactive systems, such as, Taiwan Patent No. I1247249 disclosed an interactive intelligent speech learning doll, using the web-based digital content download program and virtual doll as interface to provide interactive intelligent language learning and guidance. The disclosed art may determine in real-time whether the learner's pronunciation is correct and may provide correct conversation instruction by using interactive doll to provide speech recognition and the built-in or downloaded pronunciation database. Taiwan Patent No. M244957 disclosed a speech toy with bi-directional conversation capability. The disclosed toy includes a microphone, a speech control device, a player and peripheral devices installed inside a doll body. The inputted speech may be transmitted through the microphone to the speech control device to recognize the speech and issue commands according to the recognized speech to control the player to announce time or output other responses. The speech controller may also control the peripheral devices to project luminous lights or wave the doll body. Each inputted speech corresponds to a plurality of output speeches.

China Patent Publication No. CN1581130A disclosed an interactive language learning method with speech recognition, including: capturing and playing the speech data; recognizing the user's inputted practice speech and generating recognition data; and comparing the two data to generate an approximation value, and using the approximation value to determine the correctness of the user's practice speech. China Patent Publication No. CN 101064070A disclosed an interactive intelligent language learning doll system, connected through network, and using a doll as system front-end interface and a network server for back-end recording and storing system related data to provide an automated language learning auxiliary system for children.

U.S. Pat. No. 5,281,143 disclosed a learning doll 100. As shown in FIG. 1, the learning doll comprises a head 102 and a body 104. When the power is OFF, the power may be turned ON by kissing 106 the doll to trigger switch 108, and notifying a microprocessor and speech synthesizer 110 that the trigger detection mechanism is triggered. Microprocessor and speech synthesizer 110 uses a power amplifier/filter 116 to transmit the audio to a microphone 114. Microprocessor and speech synthesizer 110 uses a listen amplifier 120 to detect the audio from microphone 114. Microprocessor and speech synthesizer 110 may also trigger an electric motor 122 inside head 102 so that the lips of the doll may vibrate irregularly to make the speech more vivid. Accordingly, the doll may perform language teaching through the combination of human speech and touch interaction.

However, the prior arts do not show an interactive mechanism based on the objective of learning by teaching for encouraging the learner to continuously practice the learning target. Users may learn by teaching the virtual or real target to make correct response.

SUMMARY

The present disclosure may provide a speech interactive system and method.

In an exemplary embodiment, the disclosed relates to a speech interactive system. The system comprises a target information receiving module, an interactive mode setting and speech processing module, an interactive information update module, a decision module, and an output response module. The target information receiving module receives target information and sets corresponding target text sentence information. The interactive mode setting and speech processing module receives a speech signal, sets an interactive mode, determines target text sentence information for the speech signal, and outputs an assessment for a target text sentence. Under the set interactive mode, the interactive update module updates the information in an interactive information recording table according to the assessment and a timing count. According to the interactive mode and the updated information in the interactive information recording table, an output response for the target text sentence information is generated. According to the output response and the recorded information, the output response module generates response information.

In another exemplary embodiment, the disclosed relates to a speech interactive method. The method comprising: preparing an interactive information recording table for recording the interactive text sentence information; receiving a speech signal inputted by a user and deciding the corresponding target text sentence information, or receiving the given target text sentence information, to provide the user with different interactive modes to perform speech interactive operation; performing speech assessment on the inputted speech signal according to the target text sentence information and generating a speech assessment result; if receiving the given target text sentence information in the previous step, updating the information in the interactive information recording table according to the speech assessment result and a timing count; determining an output response the target text sentence information according to the different interactive modes and the updated information in the interactive information recording table; and outputting response information according to the determined output response and the updated information in the interactive information recording table.

It is to be understood that both the foregoing general description and the following detailed description are exemplary and explanatory only and are not restrictive of the invention, as claimed.

DETAILED DESCRIPTION OF THE PREFERRED EMBODIMENTS

The exemplary embodiments disclosed the designs of a speech interactive system and method based on the "learning by teaching" philosophy. The meaning of the "learning by teaching" is a learner understands the learning contents, and then the learner teaches a virtual or a real subject according to the understanding of the learning contents. The learner may understand the virtual or real subject's learning status through the response from that subject. In this manner, the learner may practice further in understanding the learning contents so that the virtual or real subject may respond correctly. Hence, the learner finally learns through teaching a virtual or real subject on the learning contents.

In the exemplary disclosed embodiments, through creating a virtual or real system to allow the learner interact through speech, the method constructs a mechanism able to receive the virtual or real learning target so that the learner may set the learning target accordingly, constructs a speech interactive mechanism so that the virtual or real system may receive and recognize the learner's inputted speech for this learning target and perform speech assessment, constructs a forgetting mechanism for the virtual or real system to urge the learner to continuously practice the learning target, and constructs a mechanism for outputting the virtual or the real subject's learning status so that the learner and others may understand the learner's understanding of the learning target through the response of the virtual or real subject.

Figure 1:
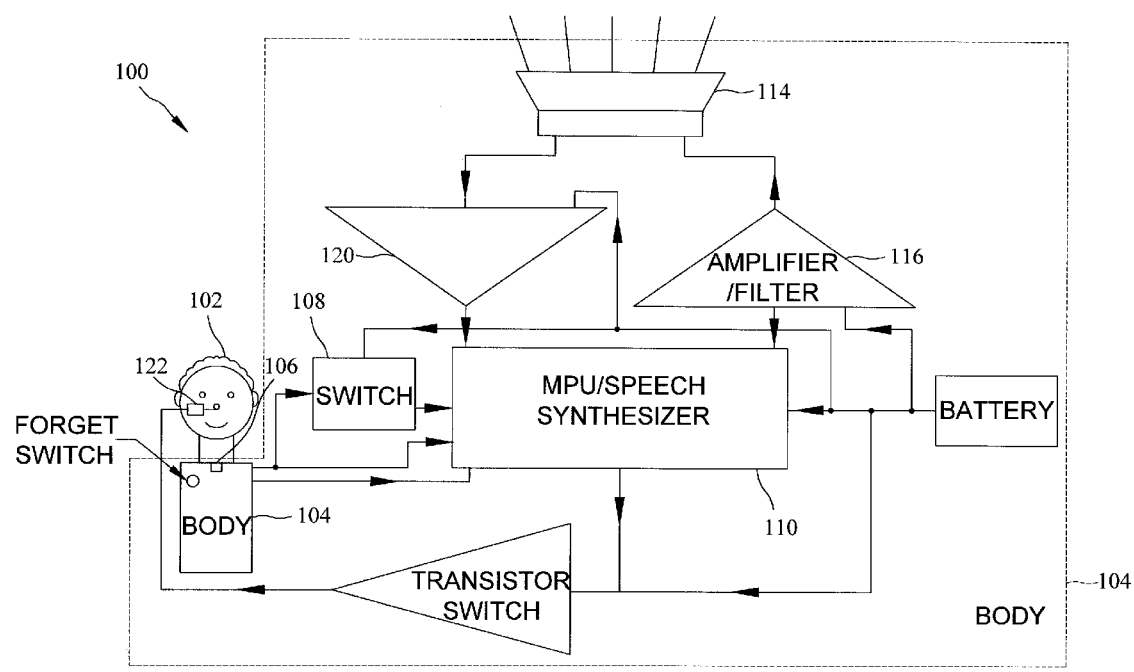
FIG. 1 shows an exemplary schematic view of a conventional learning doll.
Figure 2:
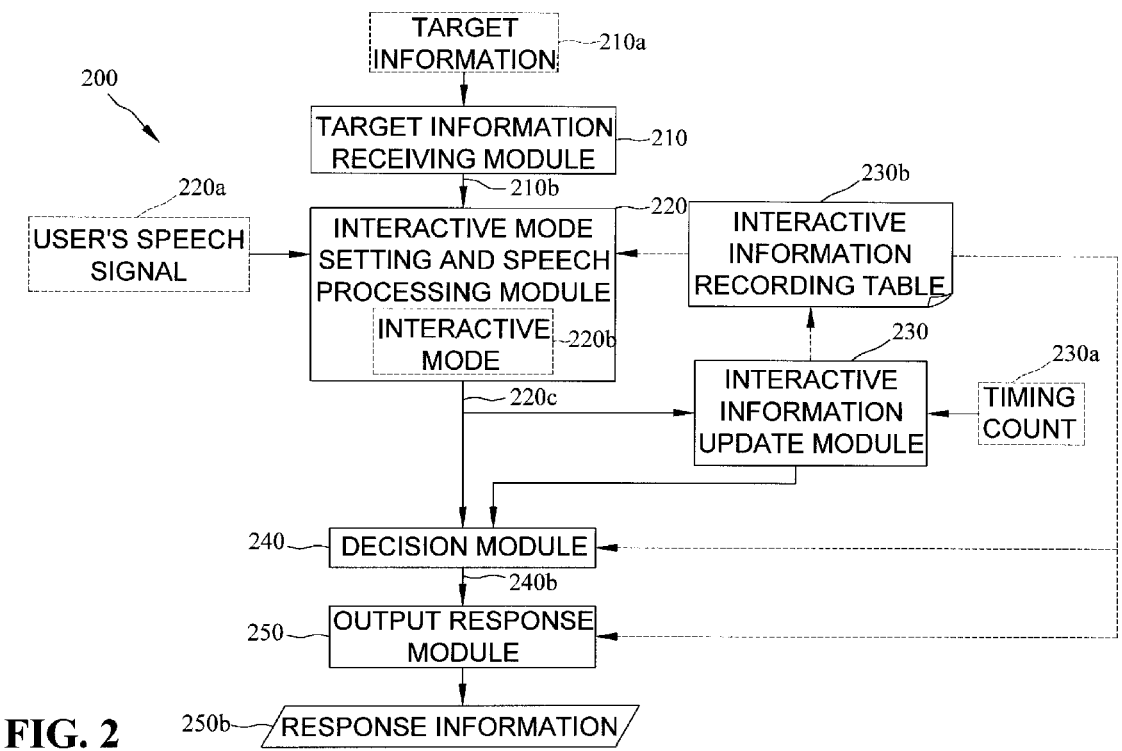
FIG. 2 shows an exemplary schematic view of a speech interactive system, consistent with certain embodiments.

FIG. 2 shows an exemplary schematic view of a speech interactive system, consistent with certain embodiments. Referring to FIG. 2, a speech interactive system 200 comprises a target information receiving module 210, an interactive mode setting and speech processing module 220, an interactive information update module 230, a decision module 240, and an output response module 250. Target information receiving module 210 receives target information 210$a$ and sets corresponding target text sentence information 210$b$. Interactive mode setting and speech processing module 220 receives a user's speech signal 220$a$, and sets an interactive mode 220$b$, decides the speech's target text sentence information and outputs a speech assessment 220$c$ for the target text sentence. Interactive update module 230 updates the information in an interactive information recording table 230$b$ according to a timing count 230$a$ and speech assessment 220$c$ from the interactive mode setting and speech processing module 220.

According to interactive mode 220$b$ and recorded information of interactive information recording table 230$b$, decision module 240 determines an output response 240$b$ for the target text sentence information. According to the output response 240$b$ and recorded information of interactive information recording table 230$b$, output response module 250 outputs response information 250$b$. In this manner, the learner or other users may understand the learner's comprehension of the target through response information 250$b$. Timing count 230$a$ may be generated by a time counter. Interactive information recording table 230$b$ records the information of the speech interactive sentences.

Speech interactive system 200 may allow the user to perform speech interaction in different modes. In other words, interactive mode 220$b$ set by interactive mode setting and speech processing module 220 may have different contents, such as, teaching mode or conversation mode. The target setting of the interactive operation may be done by the user's speech signal or the inputted target information. The target setting of the interactive operation may be expressed as follows:

Interactive target=$f$(inputted target $i$ speech, inputted target $j$ information), where if ($i$=$j$) or ($j$=NULL), interactive target=target $i$;
if ($i$≠$j$), interactive target=target $j$;
if ($i$=NULL), interactive target=NULL.

The above expression means that (a) when only an inputted speech signal is present (i.e., $j$=NULL), the target for interactive operation (i.e., interactive target) is the corresponding text sentence information of the speech signal, i.e., interactive target=target $i$; (b) when both a given target information and an inputted speech signal are present, the target text sentence information indicated by the speech signal must be consistent with the target text sentence information corresponding to the given target information (i.e., $i$=$j$), the target for interactive operation is the above target text sentence information, i.e., interactive target=target $i$; (c) when the target text sentence information corresponding to the inputted speech signal is not consistent with the target text sentence information corresponding to a given target information (i.e., $i$≠$j$), the target for interactive operation is the target text sentence information corresponding to the given target information, i.e., interactive target=target j; and (d) when no inputted speech signal is present (i.e., i=NULL), no interactive target will be assigned (i.e., interactive target=NULL).

The setting of interactive mode 220b by interactive mode setting and speech processing module 220 depends on whether target information 210a is given. When target information 210a is given, the interactive mode 220b is in teaching mode; otherwise, in conversation mode. Mapping to the above interactive target setting, the teaching mode corresponds to (b) and (c), and conversation mode corresponds to (a). When the interactive mode 220b is in teaching mode, the processed information (speech assessment result 220c) is transmitted to interactive information update module 230. When the interactive mode 220b is in conversation mode, the processed information (speech assessment 220c) is transmitted to decision module 240.

Figure 3:
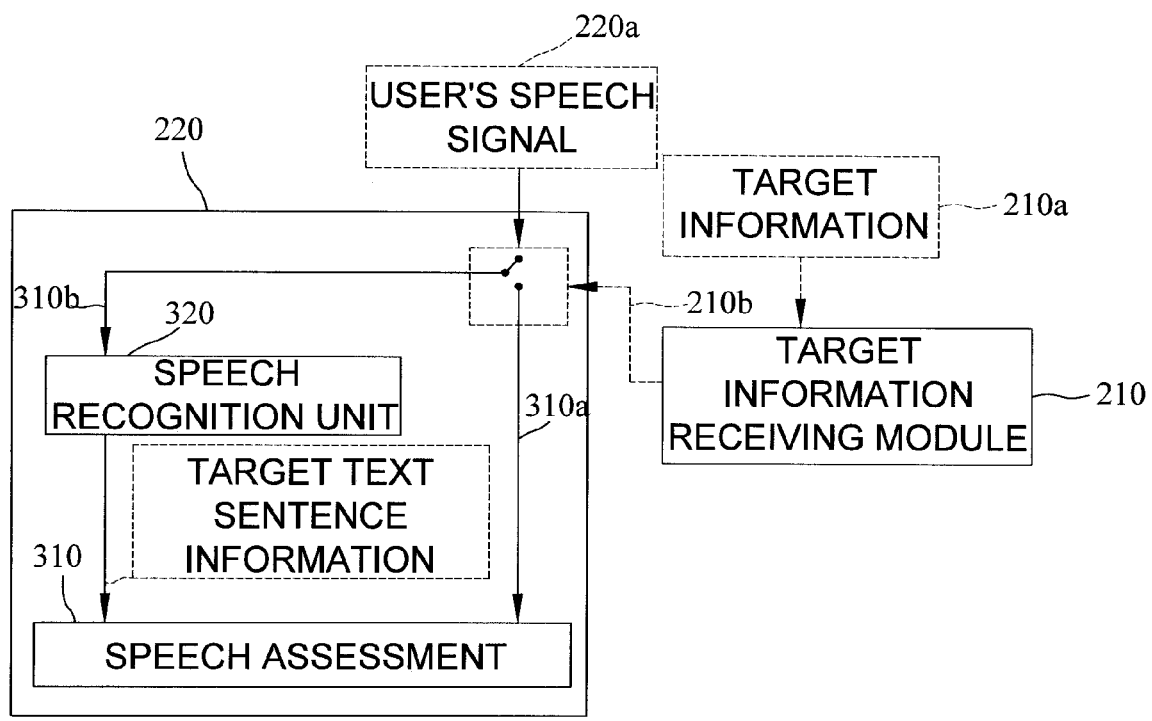
FIG. 3 shows an exemplary schematic view of an interactive mode setting and speech processing module, consistent with certain embodiments.

FIG. 3 shows an exemplary schematic view of an interactive mode setting and speech processing module 220, consistent with certain embodiments. As shown in FIG. 3, after receiving target information 210a, target information receiving module 210 obtains target item information 210b set by target information 210a, and transmits target item information 210b to interactive mode setting and speech processing module 220. For example, target information receiving module 210 receives target information "Apple", and transmits target information "Apple" to interactive mode setting and speech processing module 220. Target information 210a and target information receiving module 210 may be implemented with various technologies, such as, radio frequency identification (RFID) tag and RFID reader, barcode and barcode reader, object and object-oriented image identification, screen menu list and menu selection, and so on.

After receiving target information, interactive mode setting and speech processing module 220 sets the current operation mode as teaching mode 310a. Then, interactive mode setting and speech processing module 220 obtains corresponding interactive text sentence from interactive information recording table according to target information, and waits for a user's inputted speech signal. When the user inputs a speech signal, a speech assessment 310 is performed according to the interactive text sentence for the inputted speech signal. When the user does not give target information but only the speech signal is inputted to interactive mode setting and speech processing module 220, the current operation mode is set as conversation mode 310b. Speech recognition unit 320 recognizes the target text sentence corresponding to the inputted speech signal by taking all of the interactive text sentences in the interactive information recording table as the recognition subject, and speech assessment 310 is performed with the target text sentence and the inputted speech signal.

Figure 4:
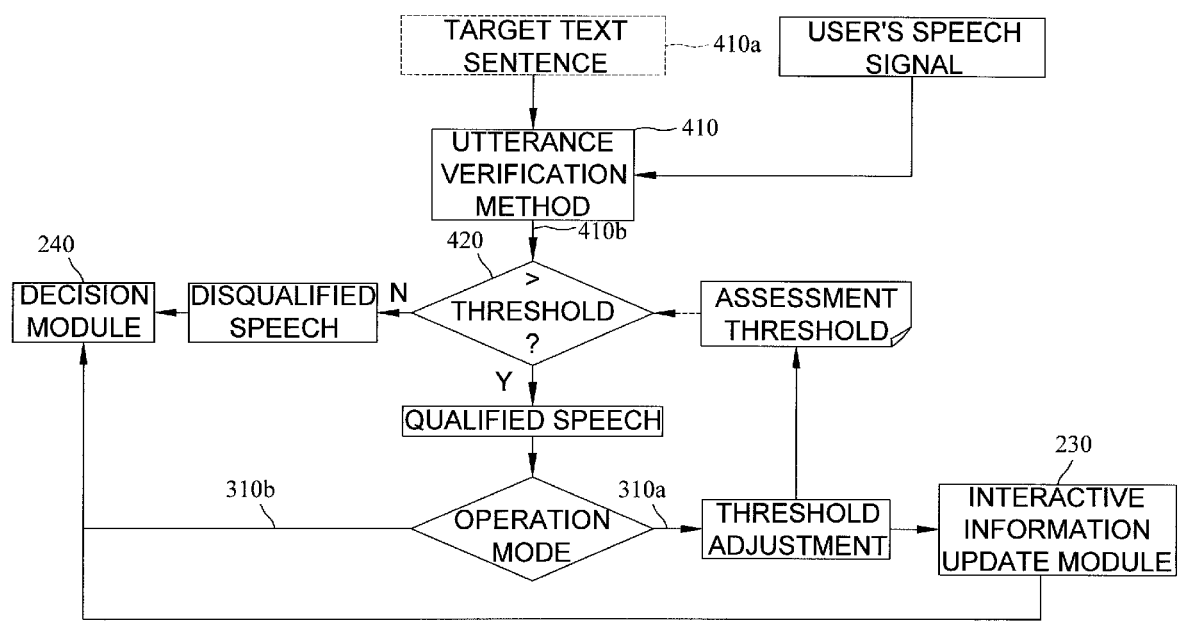
FIG. 4 shows an exemplary flowchart, illustrating the operation of speech assessment, consistent with certain embodiments.

FIG. 4 shows an exemplary flowchart, illustrating the operation of speech assessment, consistent with certain embodiments. As shown in FIG. 4, according to the target text sentence 410a and the inputted speech signal, an utterance verification method 410 is used to verify the consistency between the target text sentence 410a and the content of inputted speech signal and a verification score 410b is obtained. Other measurable relational scores between the speech signal inputted and the target text sentence 410a may also be used as verification score 410b, such as, the speech recognition score as the verification score. After obtaining the verification score, verification score 410b is compared with a preset threshold, shown as step 420. When the verification score is higher than the threshold, the inputted speech signal is a qualified speech; otherwise, a disqualified speech.

When the inputted speech signal is a qualified speech, and the current operation mode is in teaching mode, the subsequent processing includes threshold adjustment, updating the interactive information corresponding to the target text sentence by the interactive information update module, and entering decision module for processing. The threshold adjustment is to prevent the threshold from being too high so that no user may pass the threshold, or being too low so that any user may input any speech and obtain well assessment result easily. The threshold setting may also be done by a dynamic adjustment method so that the threshold may be dynamically adjusted according to the user's speech characteristic. For example, threshold adjustment may refer to the n previous verification scores, n is positive integer. Initially, the threshold may be set lower (the lower threshold may be obtained in advance of runtime by collecting and evaluating the verification scores from training data), and then the verification scores higher than the threshold may be selected for dynamic adjustment. A linear combination of the selected verification scores, i.e. averaging score, may be referred to for dynamic adjustment. After the threshold adjustment, a new threshold is obtained for the next utterance verification and is provided to the interactive information update module for updating the assessment threshold.

When the current operation is in conversation mode, no matter whether the inputted speech signal is qualified or disqualified, the process goes to the decision module.

Figure 5:
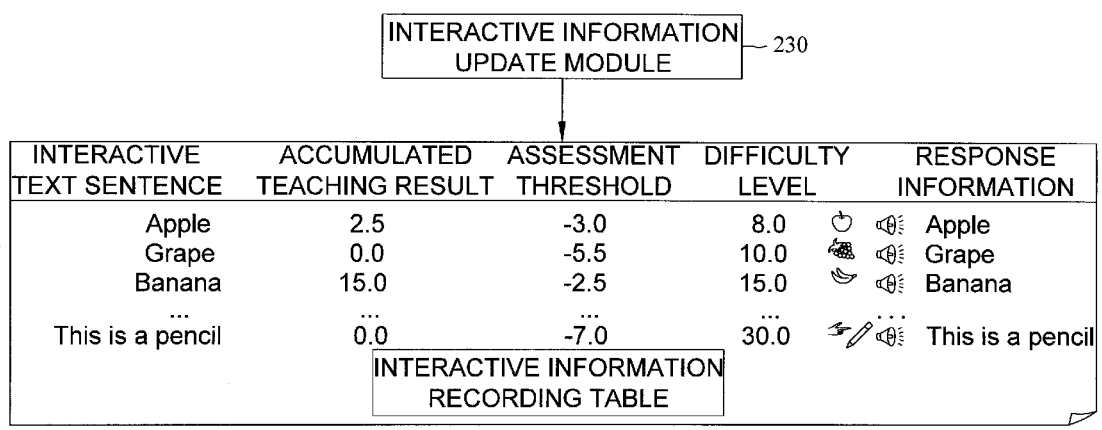
FIG. 5 shows an exemplary interactive information recording table, consistent with certain embodiments.

After receiving the speech assessment result information from interactive mode setting and speech processing module 220, interactive information update module 230 updates interactive information recording table 230b accordingly. The speech assessment result information may also include the target text sentence, verification score and threshold adjustment value. In the exemplary embodiments, interactive information recording table 230b defines a plurality of information corresponding to the target text sentence, such as, interactive text sentence, accumulated teaching result, assessment threshold, difficulty level, response information, and so on. The response information of the target text sentence may be presented in multimedia, such as, image or speech. FIG. 5 shows an exemplary interactive information recording table, consistent with certain embodiments.

In the example of FIG. 5, the row information may be set as a default value when it is not updated firstly. For example, the default values for the interactive text sentence, accumulated teaching result, assessment threshold, difficulty level and response information for target text sentence "Grape" are Grape, 0.0, −5.5, 10.0 and the image and speech of Grape, respectively. The setting of the default values for different target text sentences may be different. For example, the difficulty level for target text sentence "Apple" and target text sentence "This is a pencil" may be 8.0 and 30.0, respectively, to emphasize the difficulty level of different target text sentences. The threshold adjustment value transmitted from the interactive mode setting and speech processing module may be directly used to replace the corresponding assessment threshold information of the target text sentence, and accumulated teaching result may be obtained with the following formula:

$$\text{Accumulated teaching result} = \text{current teaching result } L_C + \text{previous accumulated teaching result } L_T,$$

where, current teaching result $L_C$ is a function of the verification score and assessment threshold, such as, the difference between the verification score and the assessment threshold. If previous accumulated teaching result $L_T$ is greater than or equal to the difficulty level, previous accumulated teaching result $L_T$ is equal to the difficulty level.

For example, the verification score and the threshold adjustment value for target sentence "Apple" transmitted by interactive mode setting and speech processing module 220 are −2.0 and −3.0, respectively. In the interactive information recording table, the accumulated teaching result $L_T$ for target text sentence "Apple" is 2.5, the above formula may be computed as:

Accumulated teaching result=(−2.0−(−3.0))+2.5=1.0+ 2.5=3.5

That is to say, the accumulated teaching result for target text sentence "Apple" is 3.5.

It can be noted that the verification score is considered as the presentation of user's teaching result. And the teaching result is the speech assessment score based on an assessment threshold adjusted by user's speech characteristics. Hence, although different users may have different speech assessment thresholds because of different speech characteristics, the teaching result may be similar. Also, because the assessment threshold may be dynamically adjusted according to the user's past pronunciation(s), the speech assessment threshold will gradually stabilize and match the user's speech characteristics after several adjustments. Therefore, the user needs to pronounce the sentence correctly in order to obtain good teaching result. A positive response will be feedback to user because of good teaching result. It may encourage user to make correct pronunciation(s). In this manner, the exemplary embodiments may bring user a correct learning result by the correct teaching.

Another exemplary equation for the accumulated teaching result is related to learner's suspension from learning. When the learner has stopped practicing the interactive text sentence for a period of time, the learner may forget the pronunciation of interactive text sentence gradually in most cases. In the exemplary embodiments, a forgetting mechanism is constructed to decrease the score of accumulated teaching result, so as to urge the learner to persist in practicing. The relation between the forgetting information and the accumulated teaching result may be expressed as the following equation:

Accumulated teaching result $L_{T+\Delta T}$=accumulated teaching result $L_T$−forgetting $F_T$, If $0<L_T<$difficulty level, then $F_T=(1-L_T/$difficulty level$)\times w$, If $L_T \geq$difficulty level or $L_T=0$, then $F_T=0$, If $F_T \geq L_T$, then $F_T=L_T$.

Where ΔT is the suspension time interval between current time and the nearest time to update the interactive text sentence record, w is a weighting factor for enhancing or reducing the penalty for slack learning. Whenever the suspension time interval ΔT has reached to a predefined period, the accumulated teaching result is updated once, i.e. decreasing the score of accumulated teaching result.

Figure 6:
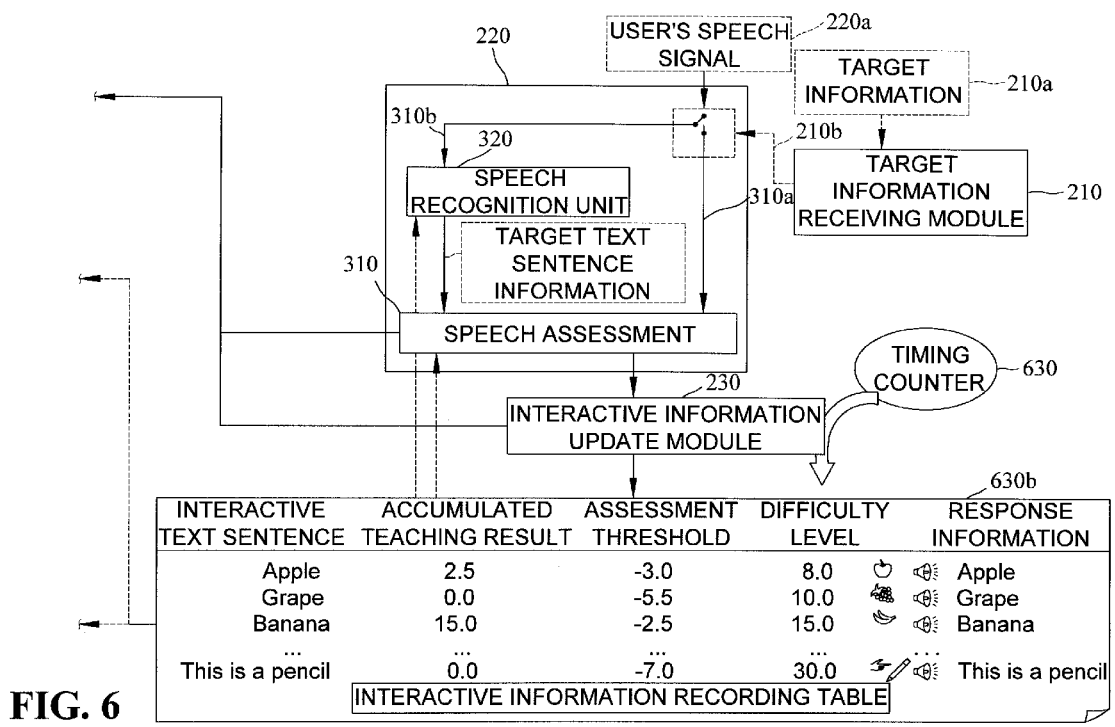
FIG. 6 shows an exemplary schematic view illustrating the operations between an interactive information update module and a timing counter, consistent with certain embodiments.

"$L_T$/difficulty level" may considered as the user's learning degree on the interactive text sentence. Hence, the forgetting equation (1−$L_T$/difficulty level) may be regarded as the unaccomplished degree for the learner on the interactive text sentence. The value of forgetting equation (1−$L_T$/difficulty level) may be obtained by computing the accumulated teaching result and difficulty level. Accordingly, as the suspension time is increased, the update number is increased. The accumulated teaching result $L_T$ will be decreased to 0 if no more learning is performed on the interactive text sentence. Therefore, as shown in the example of FIG. 6, the update triggers for the interactive information update module 230 may come from the interactive mode setting and speech processing module 220 and the time counter 630 both. In actual application,
the time interval ΔT may be set an hour or a day. Alternatively, an additional field for recording the update time for the interactive information recording table 630b may be used for more detailed update on each interactive text sentence record, so that the update may be made independently.

In the teaching mode, after interactive information update module 230 finishes updating interactive text sentence record corresponding to information of the target text in interactive information recording table 230b, the process goes to the decision module 240 to make the output decision 240b. After that, the process goes to the output response module 250 to output the response information 250b. Refer to the embodiment in FIG. 7 and FIG. 8, the following description describes the detailed operation of the decision module 240 and the output response module 250, consistent with certain disclosed embodiments.

Figure 7:
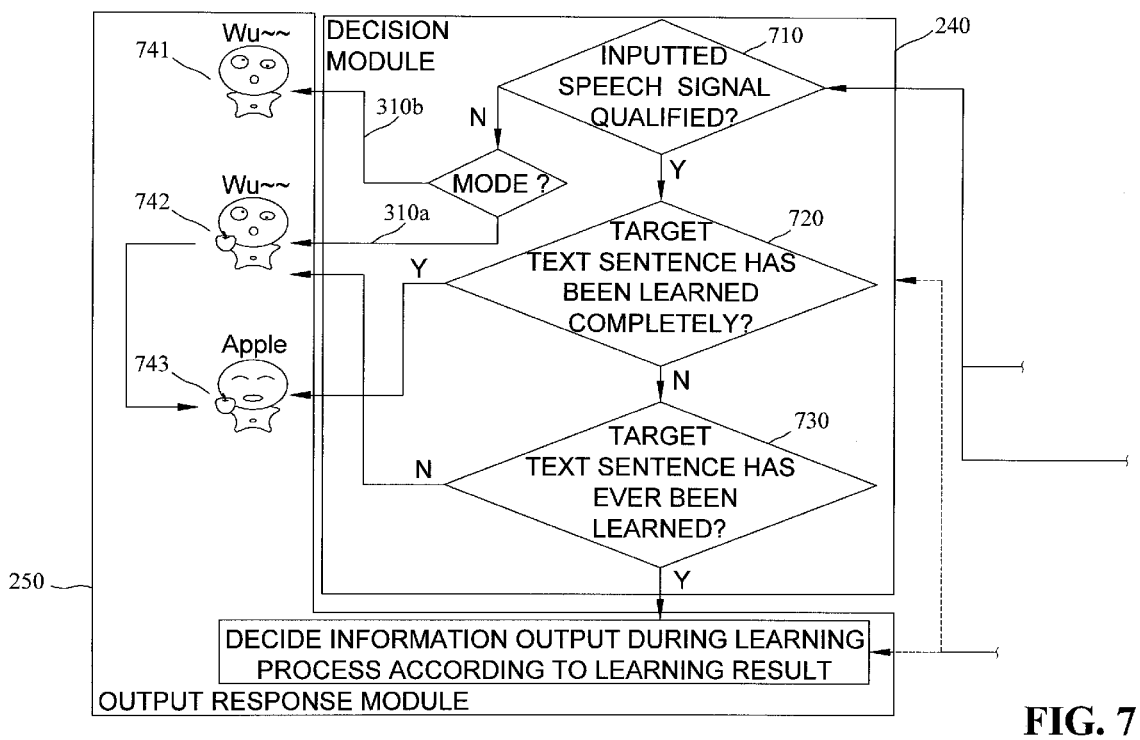
FIG. 7 shows an exemplary schematic view illustrating the operation of a decision module, consistent with certain embodiments.

In the example of FIG. 7, the decision module 240 determines whether the inputted speech signal is qualified or not (block 710) firstly. If the inputted speech signal is not qualified, a confused response corresponding to with or without input of target information is outputted depending on the interactive mode. If the interactive mode is in conversation mode 310b, the confused output is without input of target information 741. If the interactive mode is in teaching mode 310a, the confused output is with input of target information 742. The difference between 741 and 742 is whether it may express the corresponding output response of the target information or not, such as, displaying the corresponding image of the target information (e.g., an exemplary image of apple). The commonality between the two is to express the confused response to the learner for the disqualified speech signal and tempt the learner to input speech again.

In an actual application, the two responses may be very different according to different needs. For example, the confused outputs may be expressed with a plurality of output images or speeches to enrich the expressions. Alternatively, different interactive modes may use the same confused response as output to simplify the expression. For the confused response with input of target information 742, a complete learning output of the target text sentence such as a complete learning output 743 may be added to teach the learner the correct expression of the target text sentence and make the learner understand the correspondence between the target information and the correct expression. In this manner, the learner may learn by himself/herself without any tutor. This correct teaching occurs when the discrepancy between the correct pronunciation and the learner's actual pronunciation is large, i.e., the disqualified speech. When there is no target information (i.e., the actual target is unknown) or the inputted speech signal is qualified (i.e., the learner pronounces well and no hint is required), the correct teaching is not necessary.

For the qualified speech signal, decision module 240 uses the accumulated teaching result and difficulty level of the interactive information of the target text sentence in the interactive information recording table to decide whether the target text sentence has been learned completely, marked as 720. If the accumulated teaching result is greater than the difficulty level, it means the target sentence is learned, then the learned output of the target text sentence is outputted, marked as 743; otherwise, it means the learning is not accomplished yet, and the accumulated teaching result of the target text sentence may be used to decide whether the target text sentence has ever been learned, marked as 730. If the accumulated teaching result is 0 (the accumulated teaching result is decremented to 0 because of long absence of learning and oblivion), decision module 240 decides that the target text sentence is a text sentence not being learned yet, and outputs a "having target text sentence" confused response, marked as 742. Alternatively, the above "no such target text sentence" confused response may be used as an output to simplify the expression.

Therefore, with the output response, it will make the learner understand the learning status of the virtual or real subject, and may encourage the learner to practice further so that the virtual or real subject may respond correctly. This accomplishes the learning by teaching objective.

For those output responses with text sentences that have started to be learned and have not completed the learning yet, the learning process information produced according to the teaching result of the target text sentence is used as output response. Hence, the learner or other users may understand the learning subject on a virtual or real object via the output response of the virtual or real object, and may perform teaching on a virtual or real object by the understanding of the learning subject.

In the exemplary embodiments, the teaching result is defined as a function of accumulated teaching result and difficulty level. In other words, teaching result is related to the accumulated teaching result and the difficulty level. When the accumulated teaching result of the target text sentence is equal to the difficulty level, the target text sentence is considered completely learned; thus, teaching result=1. When the accumulated teaching result is equal to 0, the target text sentence is considered as not being learned yet; thus, teaching result=0. When the accumulated teaching result is between learning completed and not being learned yet, the teaching result is in a midway state with value between 0 and 1, which may be defined as $L_T$/difficulty level.

Figure 8:
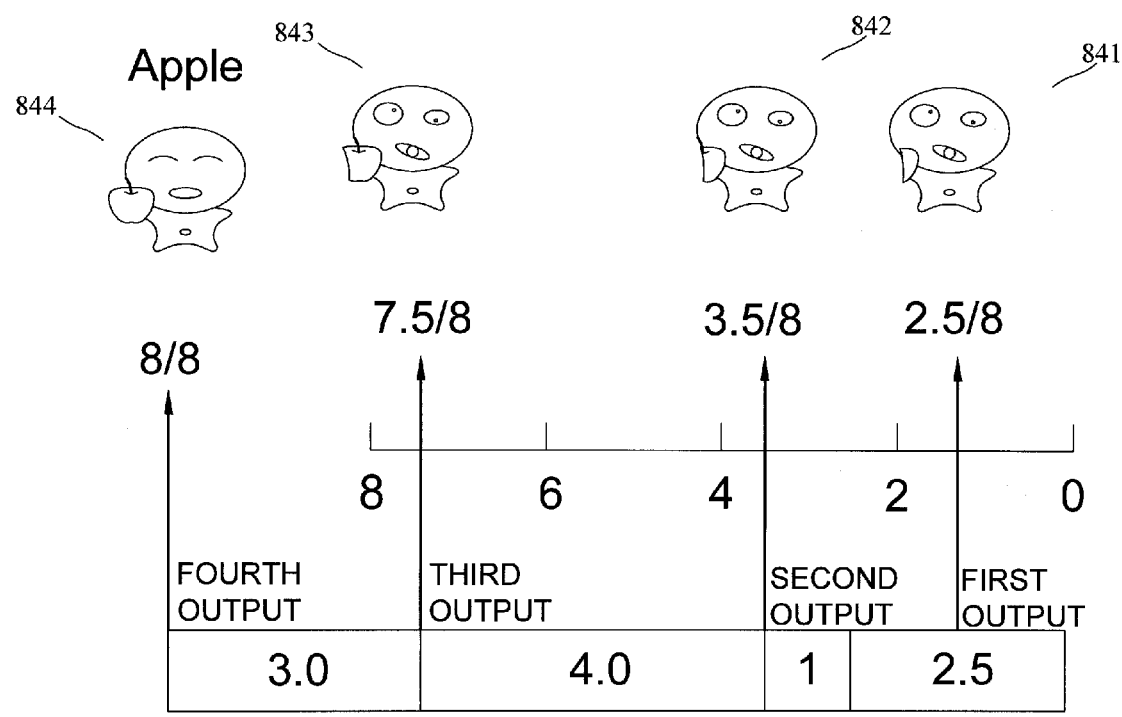
FIG. 8 shows an exemplary schematic view illustrating the operation of an output response module, consistent with certain embodiments.

The output of the midway state may depend on the ratio of $L_T$/difficulty level to output the corresponding drawings or images of the target text sentence. Similarly, the output response of speech also depends on the same ratio of $L_T$/difficulty level to output the corresponding speech of the target text sentence, as shown in FIG. 8. In the example of FIG. 8, the target text sentence is "Apple", with difficulty level 8. When outputted for the first time, accumulated teaching result $L_T$ is 2.5, and the output of the midway state uses image and corresponding partial speech as response, marked as 841. When outputted for the second time, the teaching result is 1, and the accumulated teaching result is 3.5, the output of the midway state is marked as 842. When outputted for the third time, the teaching result is 4 and the accumulated teaching result is 7.5, and the output of the midway state is marked as 843. When outputted for the fourth time, the teaching result is 3. Therefore, with the addition of the accumulated teaching result 7.5 at the third time, the accumulated teaching result $L_T$ is greater than the difficulty level. This indicates the target text sentence "Apple" has been learned completely, and the learned output of the target text sentence is outputted, marked as 844.

The representation of partial speech output of midway state may be varied. For example, the data may be directly extracted from the correct speech data according to the $L_T$/difficulty level ratio as the speech output of the midway state, or the resolution may be extracted from the correct speech data according to the $L_T$/difficulty level ratio as the speech output of the midway state, or the output result may be extracted from the correct speech data in other ways according to the $L_T$/difficulty level ratio as the speech output of the midway state. Take the resolution as an example. If an original sample is 16-bit (16 bits/sample), the sampling resolution may be downgraded to 16×($L_T$/difficulty level) bits to perform an output for the midway state.

Figure 9:
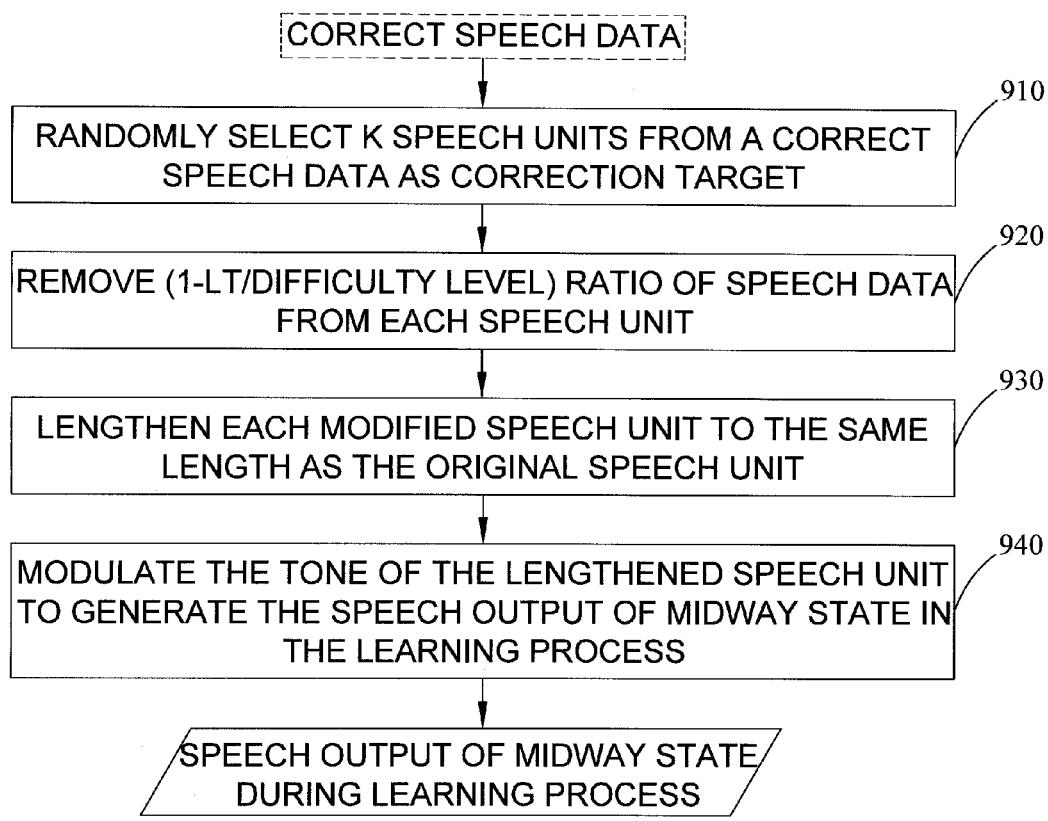
FIG. 9 shows an exemplary flowchart illustrating the operation of the output of the midway state, consistent with certain embodiments.

FIG. 9 shows an exemplary flowchart illustrating the operation of the output of the midway state, consistent with certain embodiments. Referring to FIG. 9, k speech units are randomly selected from a correct speech data as correction target, as shown in step 910. Then, (1−$L_T$/difficulty level) ratio of the speech data is removed from each speech unit, as shown in step 920. Each modified speech unit is lengthened to the same length as the original speech unit in step 930. In step 940, the tone of the lengthened speech unit is modulated to generate the speech output of midway state in the learning process. The representation of the speech output for the midway state is a simulation output with the corresponding correct speech of the original target text sentence. When the system has limited memory, the above exemplary flowchart may be used to generate various speech data for different midway states to save memory space. If the system has sufficient memory, the speech data for each possible midway state may be generated and stored for subsequent use.

Figure 10:
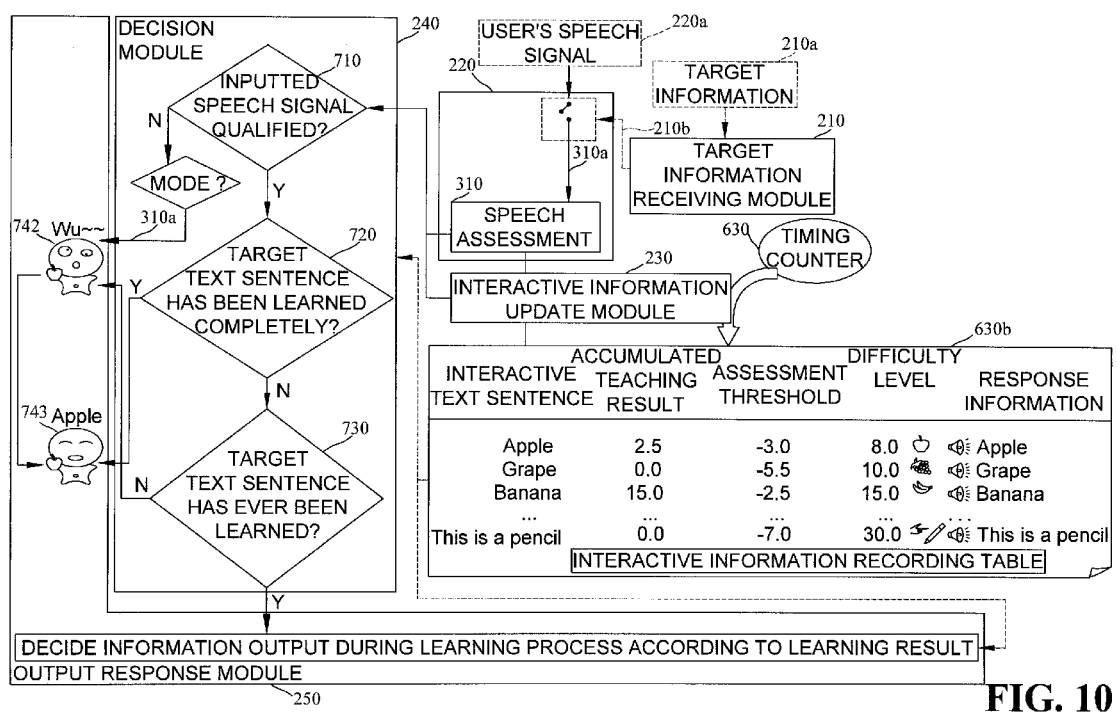
FIG. 10 shows a working example of the speech interactive system in teaching mode, consistent with certain embodiments.

FIG. 10 shows a working example of speech interactive system 200 in teaching mode, consistent with certain embodiments. Wherein, target information 210*a* may be "Apple", and a user may input a speech signal. Interactive information recording table 630*b* includes at least "Apple", "Grape", "Banana", "Pencil", and so on. Output examples for decision module 240 are as aforementioned and are omitted here.

Figure 11:
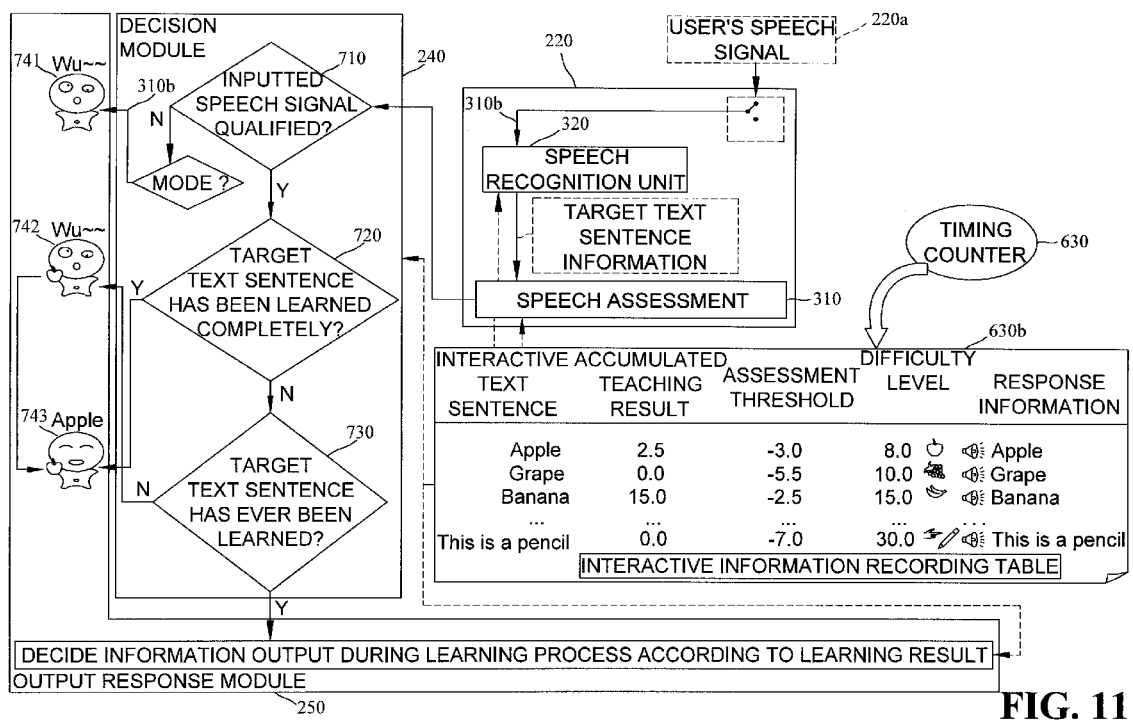
FIG. 11 shows a working example of the speech interactive system in conversation mode, consistent with certain embodiments.

As aforementioned, when the learner does not give target information, interactive mode setting and speech processing module 220 will set the interactive mode as conversation mode. When a user inputs a speech signal to interactive mode setting and speech processing module 220, speech recognition unit 320 uses all the interactive text sentences in the interactive information recording table as the recognition target to recognize the target text sentence for the inputted signal. Interactive mode setting and speech processing module 220 then performs speech assessment according to the target text sentence and the inputted speech signal to obtain a verification score, and compares the verification score with the aforementioned threshold. When the verification score exceeds the threshold, the inputted speech signal is qualified; otherwise, disqualified. Then, decision module 240 makes a further decision and output response module 250 outputs corresponding responses. The implementations of decision module and output response module are the same as in the teaching mode. FIG. 11 shows a working example of speech interactive system 200 in conversation mode, consistent with certain embodiments.

Speech interactive system 200 may also update interactive information recording table via an interactive information external update module. The interactive information external update module allows the manufacturer, when adding target information, to provide the interactive text sentence information corresponding to the target information for the users to operate so as to enrich the contents of speech interactive system 200. The interactive information external update module may be installed in a computer system, with wired or wireless connection to speech interactive system 200 to update interactive information recording table 230*b* of speech interactive system 200. Alternatively, a storage device may be used to store interactive information recording table 230*b* and the update may be done by replacing the storage device.

Another way for interactive information external update is to allow the target text sentence information corresponding to the target information to enter the interactive information recording table in speech interactive system 200 for auditing when speech interactive system 200 receives the target information. If the interactive information recording table does not contain the same target text sentence information, the target text sentence information is added to the interactive information recording table to update the content of the interactive information recording table. In other words, the target text sentence information corresponding to the target information enters, from outside, the interactive information recording table of speech interactive system 200 for auditing, and further updating the content of the interactive information recording table.

Figure 12:
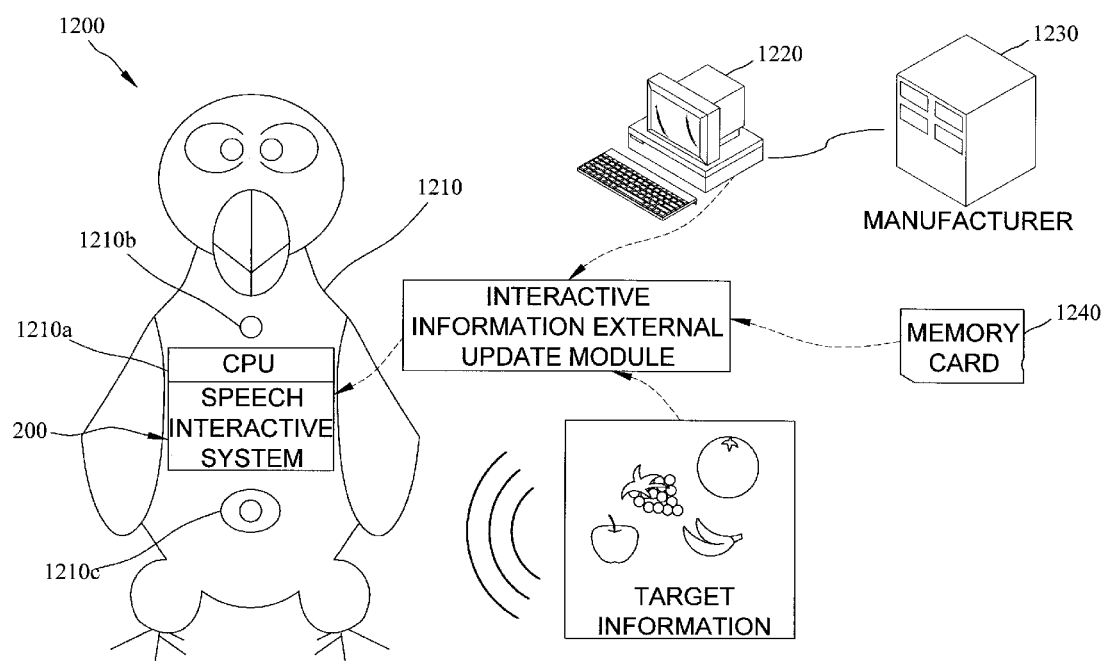
FIG. 12 shows an exemplary schematic view of the speech interactive system applied to a toy body, consistent with certain embodiments.

FIG. 12 shows an exemplary schematic view of the speech interactive system 200 applied to a toy body, consistent with certain embodiments. As shown in FIG. 12, the modules of speech interactive system 200 may be embedded inside a memory device of a body 1210 of a toy 1200. Toy body 1210 may further include a CPU 1210a, a microphone 1210b and a player 1210c. CPU 1210a executes some modules of speech interactive system 200 installed on the memory device, such as, interactive mode setting and speech processing module 220, interactive information update module 230, and decision module 240. The image information may opt to be excluded from the memory device or opt not to be executed by CPU 1210a.

Target information receiving module 210 of speech interactive system 200 receives target information externally. Microphone 1210b may receive the speech input and transmits to interactive mode setting and speech processing module 220. Player 1210c, such as, speaker, may output the speech response corresponding to the aforementioned teaching result.

Interactive information recording table 230b may be updated through a computer 1220 or a terminal device through wired or wireless connection. The updated content may be provided by a manufacturer 1230. Or, interactive information recording table may be a memory module, such as a memory card 1240, which may be updated by replacing the memory module. In addition, the target text sentence information may enter the interactive information recording table for auditing and further updating the content of the interactive information recording table.

Figure 13:
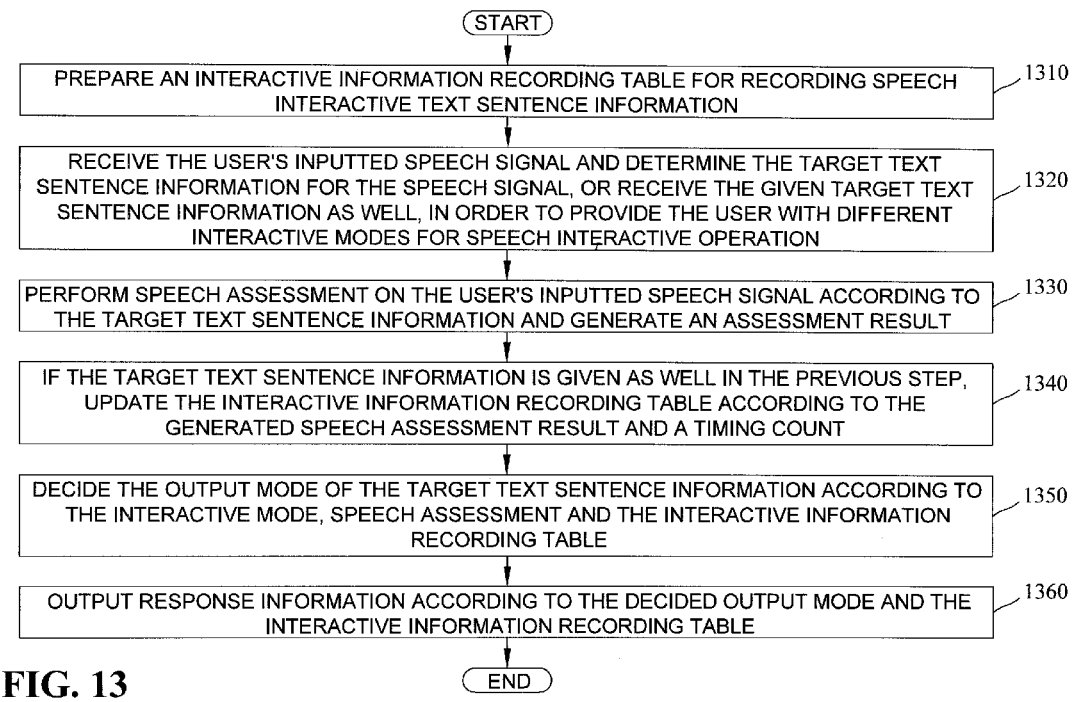
FIG. 13 shows an exemplary flowchart illustrating the major steps of a speech interactive method, consistent with certain embodiments.

According to aforementioned speech interactive system 200, FIG. 13 shows an exemplary flowchart illustrating the major steps of a speech interactive method, consistent with certain embodiments.

Referring to FIG. 13, step 1310 is to prepare an interactive information recording table for recording speech interactive text sentence information. Step 1320 is to receive the user's inputted speech signal and determine the target text sentence information for the speech signal, or receive the given target text sentence information as well, in order to provide the user with different interactive modes for speech interactive operation. Step 1330 is to perform speech assessment on the user's inputted speech signal according to the target text sentence information and generate an assessment result. If the target text sentence information is given as well in the previous step, step 1340 is to update the interactive information recording table according to the generated speech assessment result and a timing count. Step 1350 is to decide the output response of the target text sentence information according to the interactive mode, speech assessment, and the interactive information recording table. Step 1360 is to output response information according to the decided output response and the information in the interactive information recording table. The response information of the decided output response may be correct response of the target text sentence, confused response of the target text sentence, and output response of a midway state with the target text sentence being started to be learned and the learning not completed yet.

In both the teaching mode and the conversation mode of speech interactive system 200, the detailed operations of the method are the same as aforementioned, and thus are omitted here.

In summary, the disclosed exemplary embodiments for speech interactive system and method are based on the "learning by teaching" philosophy to design the speech interactive mechanism to encourage the learner to practice correctly and persistently on the learning content so that the taught virtual or real object may make a correct respond finally. The speech interactive system may also update the interactive information recording table via an interactive information external update module. The disclosed exemplary embodiments may be embedded into a toy to attract user with more interested and improve the teaching result.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A speech interactive system implemented in a computer system having at least a processing device, a storage device, a text input device, a speech input device and an output device, comprising:
   a target information receiving module implemented by said processing device and including said text input device for receiving target information and setting corresponding target text sentence information;
   an interactive mode setting and speech processing module implemented by said processing device and including said speech input device for receiving a speech signal, setting an interactive mode, determining target text sentence information for said speech signal, and outputting an assessment for a target text sentence;
   an interactive information update module implemented by said processing device for updating information in an interactive information recording table stored in said storage device according to said assessment for said target text sentence and a timing count;
   a decision module implemented by said processing device for deciding an output response for said target text sentence information according to said interactive mode and said information in said interactive information recording table; and
   an output response module implemented by said processing device and including said output device for outputting response information according to said output response and said information of said interactive information recording table.

2. The system as claimed in claim 1, wherein when only said speech signal is inputted to said interactive mode setting and speech processing module, said interactive mode is set as a conversation mode.

3. The system as claimed in claim 2, wherein said conversation mode is transmitted to said decision module.

4. The system as claimed in claim 2, wherein said interactive mode setting and speech processing module further includes a speech recognition unit for receiving said speech signal and determining target text sentence information of said speech signal.

5. The system as claimed in claim 1, wherein when said speech signal is inputted to said interactive mode setting and speech processing module and said target information is provided to said interactive mode setting and speech processing module, said interactive mode is set as a teaching mode.

6. The system as claimed in claim 5, wherein said teaching mode is transmitted to said interactive information update module.

7. The system as claimed in claim 6, wherein when said speech signal is determined as disqualified by an utterance verification method, said teaching mode is further transmitted to said decision module.

8. The system as claimed in claim 1, wherein said interactive information recording table records information of a speech interactive text sentence, said information of said speech interactive text sentence is chosen from any combination of an interactive text sentence, an accumulated teaching result, an assessment threshold, a difficulty level, and response information of said target text sentence.

9. The system as claimed in claim 8, wherein said system constructs a forgetting formula and said forgetting formula operates with a timing counter.

10. The system as claimed in claim 9, wherein a value of said forgetting formula is obtained via computation of said accumulated teaching result and said difficulty level.

11. The system as claimed in claim 1, wherein said response information at least includes correct response of said target text sentence, confused response of said target text sentence, and output response of a midway state with said target text sentence being started to be learned and the learning not completed yet.

12. The system as claimed in claim 1, wherein said system updates said interactive information recording table via an interactive information external update module.

13. The system as claimed in claim 12, wherein said system stores said interactive information recording table with a memory device, and updates said interactive information recording table by replacing said memory device.

14. The system as claimed in claim 12, wherein said interactive information external update module is installed on a computer system and linked to said speech interactive system to update said interactive information recording table of said speech interactive system.

15. The system as claimed in claim 1, wherein said system is embedded inside a body of a toy.

16. The system as claimed in claim 15, wherein said speech input device includes a microphone for receiving a speech input as said speech signal and said output device includes a speech player for outputting a speech response corresponding to said accumulated teaching result.

17. A speech interactive method implemented in a computer system having at least a processing device, a storage device, a text input device, a speech input device and an output device, comprising:
preparing an interactive information recording table in said storage device for recording speech interactive text sentence information;
receiving a speech signal from a user using said speech input device and determining target text sentence information for said speech signal, or receiving given target text sentence information as well using said text input device, in order to provide said user with different interactive modes for a speech interactive operation;
performing a speech assessment on said target text sentence information and generating an assessment result of a target text sentence;
updating said interactive information recording table according to said generated speech assessment result and a timing count if said target text sentence information is given and received from said text input device as well;
deciding an output response of said target text sentence information according to the interactive mode, speech assessment result, and said interactive information recording table; and
outputting response information using said output device according to said decided output response and said interactive information recording table.

18. The method as claimed in claim 17, wherein said different interactive modes includes a teaching mode and a conversation mode.

19. The method as claimed in claim 17, wherein said interactive information recording table records information of a speech interactive text sentence, and said information of said speech interactive text sentence is chosen from any combination of an interactive text sentence, an accumulated teaching result, an assessment threshold, a difficulty level, and response information of said target text sentence.

20. The method as claimed in claim 19, wherein said accumulated teaching result is related to a suspension time, said suspension time is a time unit passed since last update of learning said target text sentence, said accumulated teaching result is obtained via a forgetting formula, and a value of said forgetting formula is obtained via computation of said accumulated teaching result and said difficulty level.

21. The method as claimed in claim 17, wherein when only said speech signal is received from said speech input device, a conversation mode is provided to said user for an interactive operation, and all interactive text sentences in said interactive information recording table are used as recognition targets for recognizing target text sentence information corresponding to said speech signal, then a speech assessment is performed with the recognized target text sentence information and said speech signal to obtain a verification score.

22. The method as claimed in claim 21, said method refers to a combination of at least one previous said verification score, dynamically obtains a threshold adjustment value of speech verification and updates said interactive information recording table according to said threshold adjustment value.

23. The method as claimed in claim 17, wherein when said speech signal is received from said speech input device and said target text sentence information is given and received from said text input device as well, a teaching mode is provided to said user for said speech interactive operation, a speech assessment is performed on said target text sentence information to generate a speech assessment result, and said interactive information recording table is updated according to said speech assessment result.

24. The method as claimed in claim 17, wherein said response information at least includes correct response of said target text sentence, confused response of said target text sentence, and output response of a midway state with said target text sentence being started to be learned and the learning not completed yet.

25. The method as claimed in claim 24, wherein said output response of a midway state is to output a drawing or an image corresponding to said target text sentence as a response based on a ratio of accumulated teaching result/difficulty level, and for a speech output response, to output partial speech corresponding to said target text sentence according to said ratio of accumulated teaching result/difficulty level.

* * * * *